US008803806B2

(12) United States Patent
Mundt et al.

(10) Patent No.: US 8,803,806 B2
(45) Date of Patent: Aug. 12, 2014

(54) NOTEBOOK COMPUTER HAVING AN OFF-MOTHERBOARD KEYBOARD CONTROLLER

(75) Inventors: Kevin Mundt, Austin, TX (US); Orin M. Ozias, Cedar Park, TX (US); Andrew Thomas Sultenfuss, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 2074 days.

(21) Appl. No.: 11/626,100

(22) Filed: Jan. 23, 2007

(65) Prior Publication Data

US 2008/0174941 A1 Jul. 24, 2008

(51) Int. Cl.
G06F 3/02 (2006.01)

(52) U.S. Cl.
USPC .......................................... 345/168; 345/169

(58) Field of Classification Search
USPC ................ 345/168–172; 361/679.08–679.18; 702/117, 57–59, 183–185
See application file for complete search history.

(56) References Cited

U.S. PATENT DOCUMENTS

| 4,953,165 | A | | 8/1990 | Jackson |
| 5,574,891 | A | | 11/1996 | Hsu et al. |
| 5,809,226 | A | * | 9/1998 | Baldwin et al. ................ 714/43 |
| 5,892,503 | A | | 4/1999 | Kim |
| 5,952,998 | A | | 9/1999 | Clancy et al. |
| 6,006,344 | A | * | 12/1999 | Bell, Jr. .......................... 714/37 |
| 6,219,037 | B1 | * | 4/2001 | Lee ............................... 345/167 |
| 6,266,050 | B1 | * | 7/2001 | Oh et al. ........................ 345/173 |
| 6,307,736 | B1 | | 10/2001 | Song et al. |
| 6,560,612 | B1 | | 5/2003 | Yamada et al. |
| 6,595,786 | B2 | | 7/2003 | Horiuchi et al. |
| 6,609,221 | B1 | | 8/2003 | Coyle et al. |
| 6,836,850 | B2 | * | 12/2004 | Cheng .......................... 713/324 |
| 7,428,140 | B2 | | 9/2008 | Yokote |
| 2001/0011998 | A1 | * | 8/2001 | Agata et al. ................... 345/168 |
| 2001/0029128 | A1 | | 10/2001 | Horiuchi et al. |
| 2002/0109961 | A1 | | 8/2002 | Glad |
| 2002/0172001 | A1 | | 11/2002 | Homer et al. |
| 2003/0182476 | A1 | | 9/2003 | Kuo et al. |
| 2004/0102916 | A1 | * | 5/2004 | Chen et al. .................... 702/117 |
| 2005/0030289 | A1 | | 2/2005 | Crockett et al. |
| 2005/0041390 | A1 | * | 2/2005 | Huang .......................... 361/687 |
| 2006/0044259 | A1 | | 3/2006 | Hotelling et al. |
| 2006/0044751 | A1 | | 3/2006 | Peng et al. |
| 2006/0046573 | A1 | | 3/2006 | Hardell |
| 2006/0123304 | A1 | * | 6/2006 | Panis et al. ................... 714/742 |

(Continued)

OTHER PUBLICATIONS

Non-Final action issued by the US Patent and Trademark Office on Sep. 13, 2010, U.S. Appl. No. 11/626,076, 9 pages.
Non-Final action issued by the US Patent and Trademark Office on May 27, 2010, U.S. Appl. No. 11/626,039, 12 pages.
Final Action issued by the US Patent and Trademark Office on Nov. 15, 2010, U.S. Appl. No. 11/626,039, 16 pages.

*Primary Examiner* — Alexander Eisen
*Assistant Examiner* — Nelson Lam
(74) *Attorney, Agent, or Firm* — Haynes and Boone, LLP

(57) ABSTRACT

A portable information handling system, user interface components thereof, and methods of user control interface and assembly are disclosed. In one embodiment a keyboard assembly, including a large plurality of contacts for a keyboard matrix, connects directly to a palmrest assembly. The palmrest assembly includes a keyboard controller, which decodes keystrokes and then passes the decoded keystrokes to, e.g., an I/O controller on the motherboard of the portable information handling system. This arrangement can greatly improve layout and usage of the motherboard routing spaces, can improve reliability, and can simplify assembly, among other advantages.

13 Claims, 10 Drawing Sheets

(56) References Cited

U.S. PATENT DOCUMENTS

| | | |
|---|---|---|
| 2006/0125796 A1* | 6/2006 | Utz et al. ................... 345/168 |
| 2006/0208884 A1* | 9/2006 | Diamant ................... 340/568.1 |
| 2006/0258179 A1 | 11/2006 | Watanabe |
| 2007/0097079 A1 | 5/2007 | Mundt et al. |
| 2007/0109151 A1* | 5/2007 | Shaw .......................... 341/26 |
| 2007/0218731 A1 | 9/2007 | Tanaka et al. |
| 2007/0230101 A1 | 10/2007 | Wong et al. |
| 2008/0142352 A1 | 6/2008 | Wright |
| 2010/0026314 A1* | 2/2010 | Schuttert ................... 324/555 |

* cited by examiner

NOTEBOOK COMPUTER HAVING AN OFF-MOTHERBOARD KEYBOARD CONTROLLER

BACKGROUND

The description herein relates to portable information handling systems and the keyboard interconnects for such systems.

As the value and use of information continue to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Portable IHSs, such as "laptop" or "notebook" computers, generally place all or most of the components of the system in a single chassis of small enough dimensions and weight to be conveniently carried in a briefcase or similarly sized carrying case.

SUMMARY

A portable IHS comprises a housing enclosing a motherboard, a palmrest assembly coupled to the housing and comprising a keyboard controller, and a keyboard assembly coupled to the palmrest assembly such that the keyboard controller receives keystroke signals from the keyboard assembly. A first bus couples the keyboard controller to the motherboard through the palmrest assembly, with the keyboard controller transmitted decoded keystrokes to the motherboard over the bus.

In another aspect of the disclosure, a computer palmrest assembly comprises a circuit board, a keyboard controller mounted to the circuit board, and a connection point to receive a keyboard assembly. The connection point has a plurality of electrical connections connected through the circuit board to the keyboard controller. The palmrest assembly further comprises a first connector to pass decoded keystroke information from the keyboard controller to another device located off the palmrest assembly.

In yet another aspect of the disclosure, a keyboard comprises a rigid lower frame having a connection tab along its bottom edge for mechanical connection to a palmrest assembly, and a conductor matrix overlying the rigid frame and defining conductor crossing points substantially aligned with key locations on the keyboard. The conductor matrix comprises extensions of the matrix conductors onto the connection tab to form a plurality of contacts for electrical connection of the keyboard to the palmrest assembly.

In still another aspect of the disclosure, a diagnostic system for a portable computer comprises a motherboard having a first I/O controller, a palmrest assembly having a second I/O controller, and a bus connection linking the first I/O controller to the second I/O controller through the motherboard and palmrest assembly. A keyboard assembly connects to the palmrest assembly. A loopback circuit on the palmrest assembly and keyboard assembly allows the second I/O controller to test the continuity of the connection between the keyboard assembly and the palmrest assembly.

Also disclosed is a method of coupling a keyboard assembly to a portable IHS. The method comprises assembling a keyboard connector into the palmrest assembly of a portable IHS, and inserting a substantially rigid keyboard assembly connector tab, integral to a keyboard assembly and having electrical connections for the keyboard assembly, into the keyboard connector of the palmrest assembly as part of a process of aligning the keyboard assembly in its final position in the IHS. The keyboard assembly is secured to the IHS.

The disclosure also describes a method of inputting keystroke information to a portable IHS. The method comprises translating user keystrokes on a keyboard assembly into electrical signals, transmitting the electrical signals through a connector from the keyboard assembly to a palmrest assembly comprising a keyboard controller, and decoding the electrical signals in the keyboard controller into decoded keystrokes. The decoded keystrokes are transmitted over a first serial bus to a motherboard located in the portable IHS.

One other aspect of the disclosure relates to a portable IHS comprising a housing, a motherboard located within the housing, a pointing device assembled to the housing to allow user pointing inputs, and a keyboard assembled to the housing to allow user keyboard inputs. The system includes at least one I/O controller, located off the motherboard, to decode the user pointing inputs and decode user keyboard inputs, and at least one serial bus to communicate the decoded user pointing inputs and the decoded user keyboard inputs to the motherboard.

DETAILED DESCRIPTION

For purposes of this disclosure, an IHS includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Figure 1:
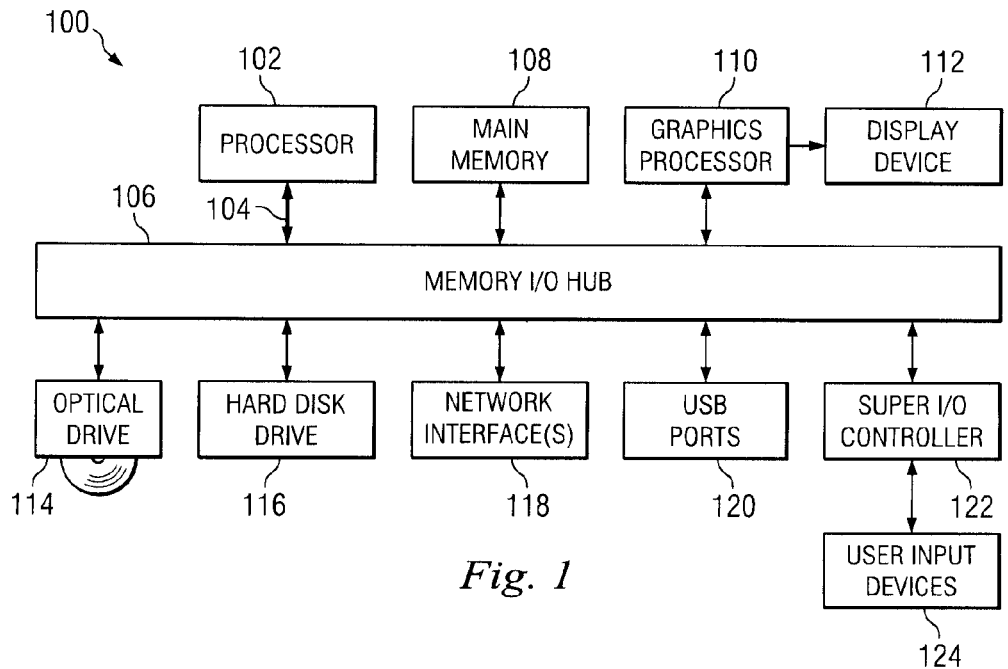
FIG. 1 is a block diagram illustrating an embodiment of an IHS.

FIG. 1 is a block diagram of one typical IHS. The IHS 100 includes a processor 102 such as an Intel Pentium series processor or one of many other processors currently available. A memory I/O hub chipset 106 (comprising one or more integrated circuits) connects to processor 102 over a front-side bus 104. Memory I/O hub 106 provides the processor 102 with access to a variety of resources. Main memory 108 connects to memory I/O hub 106 over a memory bus. A graphics processor 110 also connects to memory I/O hub 106, allowing the graphics processor to communicate, e.g., with processor 102 and main memory 108. Graphics processor 110, in turn, provides display signals to a display device 112.

Other resources can also be coupled to the system through memory I/O hub 106, including an optical drive 114 or other removable-media drive, one or more hard disk drives 116, one or more network interfaces 118, one or more USB (Universal Serial Bus) ports 120, and a super I/O controller 122 to provide access to user input devices 124, etc.

Not all IHS include each of the components shown in FIG. 1, and other components not shown may exist. Furthermore, some components shown as separate may exist in an integrated package or be integrated in a common integrated circuit with other components. As can be appreciated, many systems are expandable, and include or can include a variety of components, including redundant or parallel resources.

Figure 2:
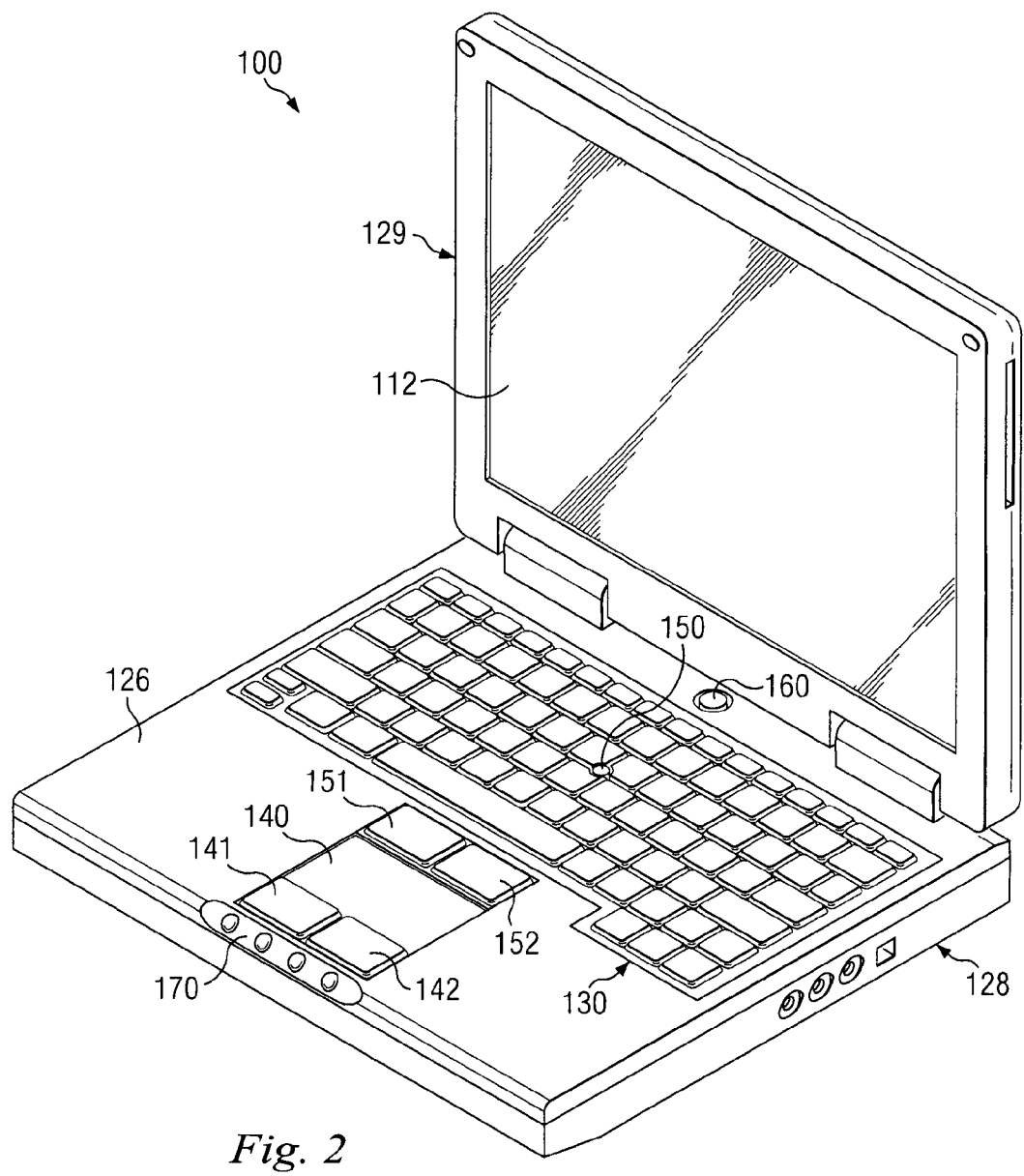
FIG. 2 illustrates the external configuration of an embodiment of a portable IHS.

One physical configuration for an IHS 100 is as a "portable" or "laptop" computer. Such portable computers typically combine the processing components of IHS 100 with a display, input devices, and a battery in a common case, to provide a device that can be easily transported and used almost anywhere. As such, portable IHSs generally benefit from miniaturization of size and weight of the IHS components. Referring to FIG. 2, an exemplary view of a portable computer IHS 100 is illustrated in a typical clamshell configuration. In this clamshell configuration, a bottom shell 128 and a top shell 129 are hinged together with sufficient friction such that the top shell can be positioned at a variety of angles with respect to the bottom shell. The top shell can also be closed and latched to the bottom shell for easy carrying and protection of the display.

The top shell 129 houses display 112 and the bottom shell 128 typically houses the remaining components of portable IHS 100. Most, if not all, of the user controls are typically mounted on or in the top surface 126 of bottom shell 128. These controls can include a keyboard 130, a touchpad 140 and touchpad buttons 141, 142, a point stick 150 and point stick buttons 151, 152, a power button 160, and ancillary and/or media buttons 170. The battery, electronics (including a motherboard to which the electronics are mounted or connected), and drive bays are located below the user controls within the bottom shell 128, and as such are not apparent in FIG. 2.

Figure 3:
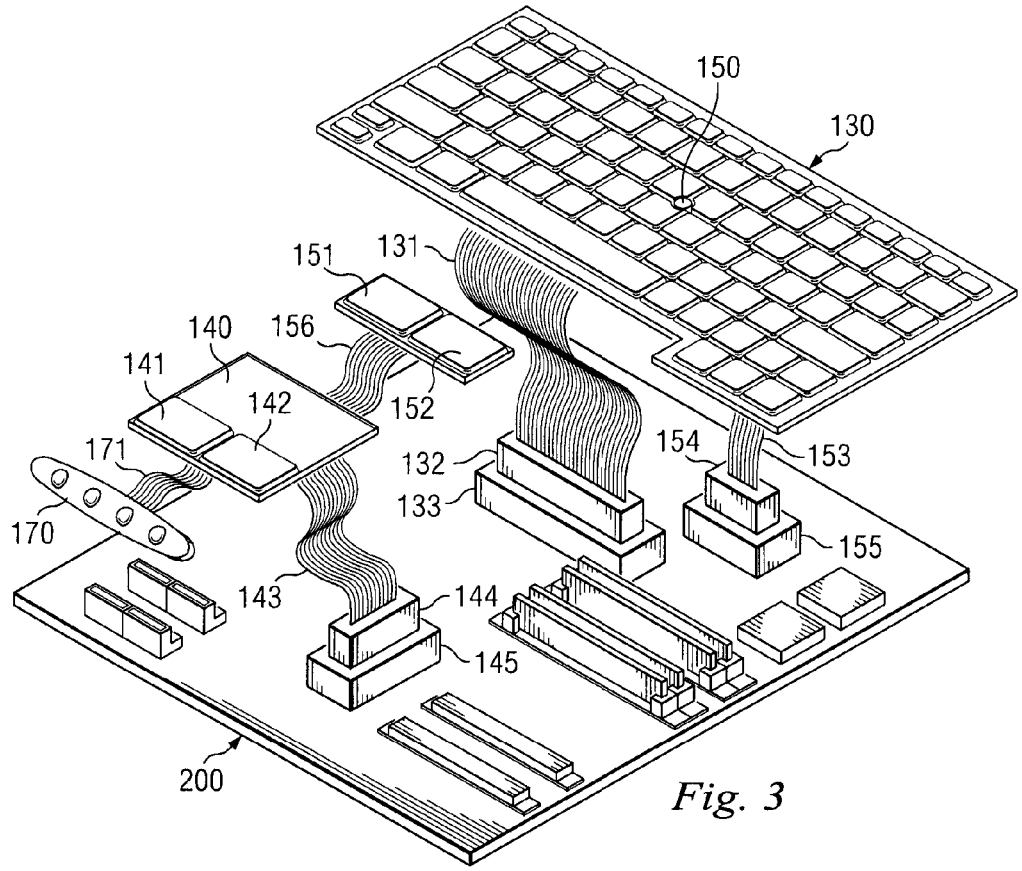
FIG. 3 contains an exploded view of the built-in user controls of an embodiment of a portable IHS, and their interconnections to the motherboard.

FIG. 3 contains an exploded view of some of the components of a portable IHS. FIG. 3 depicts the physical layout of the typical connections between the user input devices of a portable IHS and the motherboard. A motherboard 200 has connectors 133, 145, and 155, to connect the motherboard respectively to keyboard 130, touchpad 140, and point stick 150. The keyboard requires a large (greater than 25 conductors) ribbon cable 131, the cable having an end connector 132 to mate with connector 133 on motherboard 200. Ribbon cable 131 transfers signals from the keyboard matrix to the motherboard and ultimately to the super I/O controller (FIG. 1) for keystroke decoding. Additionally, a keyboard having a point stick 150 uses a smaller ribbon cable 153 having an end connector 154 to mate with connector 155 on motherboard 200. Ribbon cable 153 transfers signals from the point stick 150 to the motherboard. The touchpad 140 typically is combined with touchpad buttons 141, 142 in a common touchpad module, which uses another ribbon cable 143 having an end connector 144 to mate with connector 145. Ribbon cable 143 transfers signals from the touchpad module to the motherboard 200 and ultimately to the super I/O controller.

Other user inputs may also connect to the touchpad module. A point stick usually is accompanied by point stick buttons 151, 152, which are located below the spacebar of the keyboard and above the touchpad module on the palmrest. A ribbon cable 156 connects the point stick buttons to the touchpad module. Also, ancillary/media button assembly 170 may connect by a ribbon cable 171 to the touchpad module.

Figure 4:
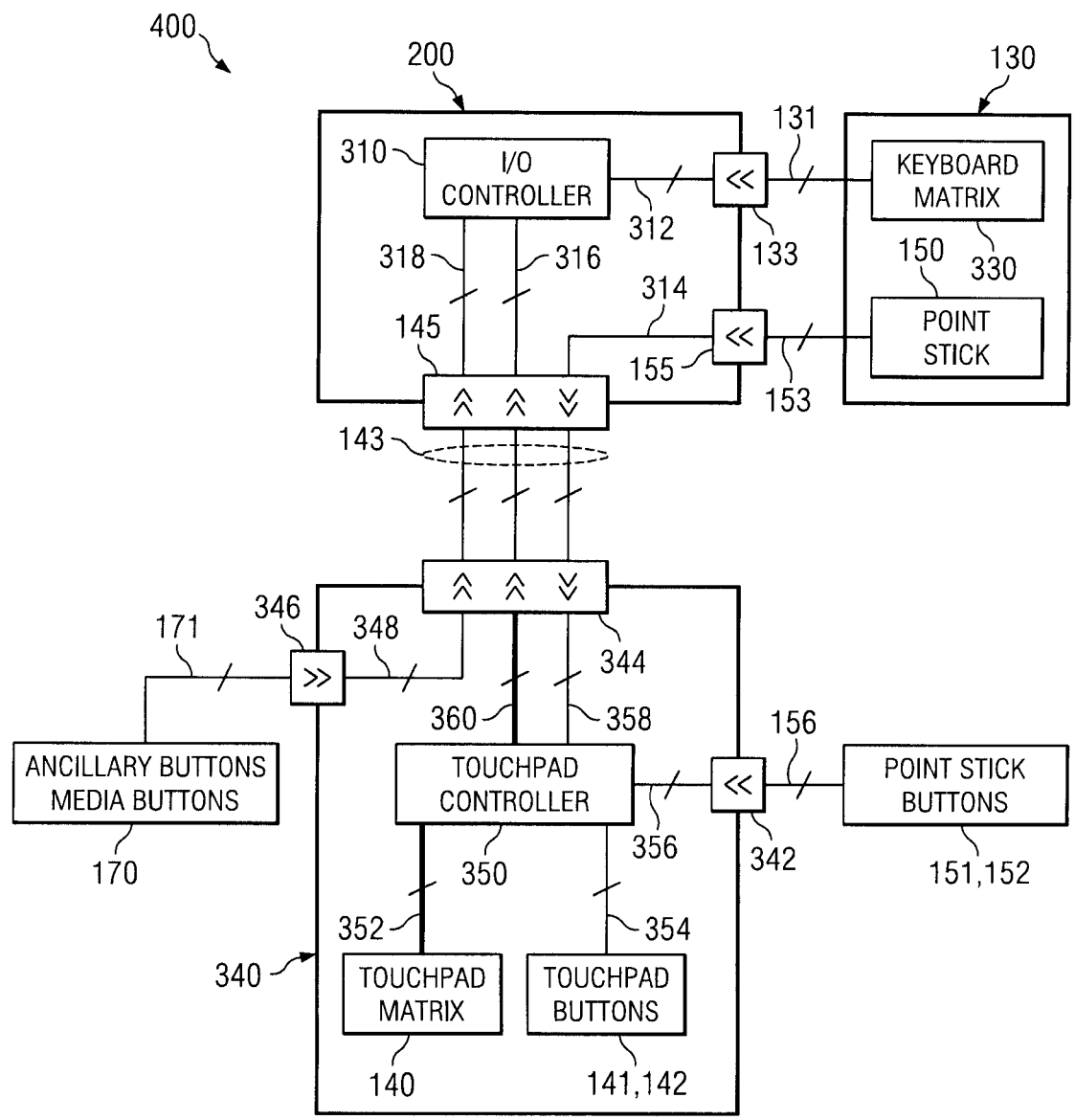
FIG. 4 shows the electrical connections and controllers for the built-in user controls of an embodiment of a portable IHS.

FIG. 4 contains an electrical diagram 400 showing the electrical connections corresponding to the physical arrangement of FIG. 3. A keyboard matrix 330 on keyboard 130 couples through connector 133 to a set of matrix traces 312 on motherboard 200. The matrix traces 312 connect in turn to an I/O controller 310, which detects keystrokes and decodes them for processing by the IHS. The point stick 150, also on keyboard 130, couples through connector 155 to a set of point stick signal transfer traces 314 on motherboard 200. The point stick traces 314 couple in turn to connector 145.

Two other sets of traces couple connector 145 to I/O controller 310. Touchpad controller traces 316 transfer signals that originate at a touchpad controller 350 to I/O controller 310. Ancillary button traces 318 transfer signals that originate at ancillary/media button assembly 170 to I/O controller 310.

A touchpad module 340 connects to motherboard 200 through ribbon cable 143 and connector 145. A connector 344 on touchpad module 340 terminates the ribbon cable conductors to three sets of traces on a touchpad module 340. A set of ancillary button signal transfer traces 348 routes signals from connector 344 to another connector 346, which couples in turn to ancillary button ribbon cable 171. A set of point stick traces 358 routes point stick signals to touchpad controller 350 for decoding. Finally, a set of touchpad controller traces 360 route signals from touchpad controller 350 to connector 344.

Touchpad module 340 also contains the touchpad matrix 140 and touchpad buttons 141, 142. A set of touchpad matrix traces 352 couple signals from matrix 140 to touchpad controller 350 for decoding. A set of touchpad button traces 354 couple signals from touchpad buttons 141, 142 to touchpad controller 350.

Touchpad module 340 also contains a third connector 342 to connect to ribbon cable 156 and point stick buttons 151,

152. A set of point stick button traces 356 on touchpad module 340 couple signals from the point stick buttons to touchpad controller 350.

A number of deficiencies in this traditional user control interface design have now been recognized. First, the keyboard requires a relatively large interconnect to the motherboard, for what are each extremely low-frequency signal lines. Due to the central placement of the keyboard in the portable IHS, the keyboard connector 133 and large number of keyboard matrix traces 312 (see FIG. 3) typically occupy extremely valuable real estate on the central portion of the motherboard, and complicate circuit board trace routing. The keyboard matrix also uses a large number of general purpose input output (GPIO) ports on the I/O controller, which could be used for advanced diagnostics and other purposes were they available.

Second, different laptop chassis designs and sizes—and even regional variations of the same design—usually require a unique keyboard due to different motherboard keyboard connector locations. It would be advantageous to decouple keyboard design from motherboard design to allow reuse of keyboards and keyboard components across multiple chassis and regions.

Third, current ribbon cable keyboard designs require a difficult "blind" assembly of the large connector. The keyboard is loosely placed over its final position in the case while the connector is mated with the motherboard, such that the keyboard itself obscures and interferes with the connection process. The process is unduly difficult for assemblers, and can result in damaged or improperly made connections. Users who remove their own keyboards may either not make the connection properly, or not even realize they have to make the connection, resulting in unnecessary service calls and returns. The multiple other palmrest connections (point stick, point stick buttons, touchpad) also slow assembly and are subject to damage or misalignment.

In systems with a point stick, connecting the point stick to the motherboard through one wire harness and then to the touchpad module through a separate harness from the motherboard is undesirable as it is complex, subject to damage, and can result in reduced signal integrity.

These and other problems are addressed by features found in one or more of the following embodiments. Generally, a keyboard controller is incorporated into the palmrest assembly (e.g., as part of the touchpad module) of a portable IHS. Various connections that are now required to the motherboard are made instead to the palmrest assembly. For instance, a new connector design allows a tab on the keyboard to be inserted into a socket in the palmrest assembly as part of mating the keyboard to the chassis, greatly simplifying assembly by, in essence, "docking" the keyboard to the system. The keyboard controller in the palmrest assembly can terminate many key press signals that were previously passed to the motherboard, and can communicate the content of the key press data with the motherboard I/O controller over a serial data bus requiring only a few traces. Other features and advantages of the embodiments will become apparent in the following description.

Figure 5:
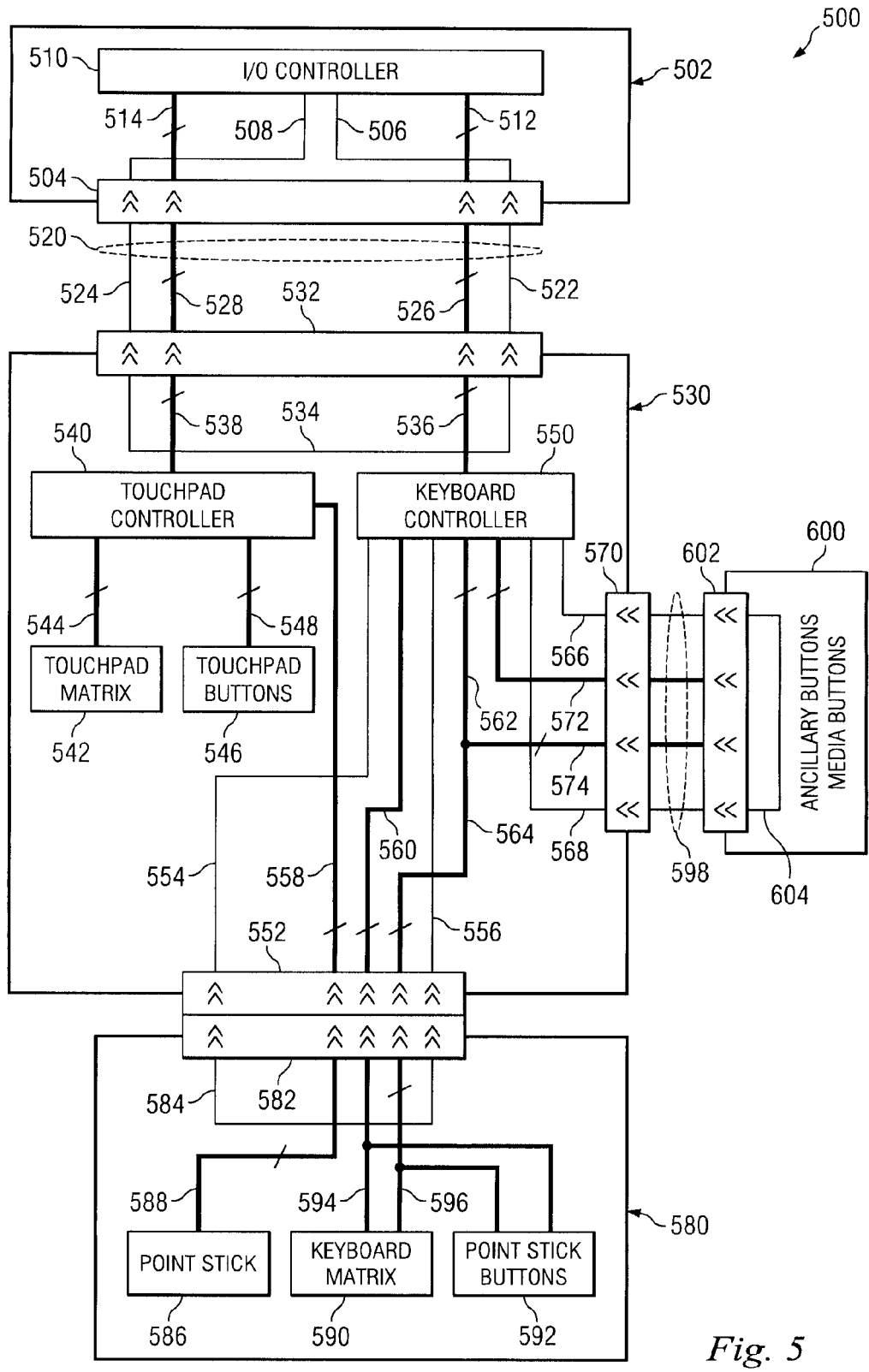
FIG. 5 shows the electrical connections and controllers for the built-in user controls of an embodiment of a portable IHS.

FIG. 5 shows the electrical connections of a first portable IHS embodiment 500. Four assemblies are shown: a motherboard 502; a palmrest assembly 530; a keyboard assembly 580; and an ancillary button assembly 600. Each will be described in turn.

Motherboard 502 includes an I/O controller 510 and other processing components (processor, etc., not shown) for the portable IHS 500. The motherboard 502 also includes a connector 504. Loopback traces 506 and 508, keyboard controller bus traces 512, and touchpad controller bus traces 514 connect the I/O controller 510 to connector 504.

A ribbon cable or other wiring harness 520 couples connector 504 to a corresponding connector 532 on palmrest assembly 530. Harness 520 includes loopback wires 522 and 524, having electrical continuity respectively with loopback traces 506 and 508, keyboard controller bus wires 526, having electrical continuity respectively with the keyboard controller bus traces 512, and touchpad controller bus wires 528, having electrical continuity respectively with the touchpad controller bus traces 514. The wiring harness also may include power connections (not shown) to power the components on the palmrest assembly.

Palmrest assembly 530 includes the motherboard connector 532, a touchpad controller 540, a touchpad matrix 542, touchpad buttons 546, a keyboard controller 550, a keyboard connector 552, an ancillary button connector 570, and various circuit board traces to connect these components. These traces will be described in detail after introduction of the keyboard assembly components.

Keyboard assembly 580 includes an integral connector 582, a point stick 586, a keyboard matrix 590, point stick buttons 592, and various circuit board traces.

Some of the connections to the touchpad controller are similar to those of FIG. 4. Touchpad controller 540 is coupled to connector 532 by a set of touchpad controller bus traces 538. A set of touchpad matrix traces 544 couple signals from matrix 542 to touchpad controller 540 for decoding. A set of touchpad button traces 548 couple signals from touchpad buttons 546 to touchpad controller 540.

Instead of coupling through the motherboard, the point stick 586 in FIG. 5 couples directly from the keyboard assembly 580 to the palmrest assembly 530. Point stick signal traces 588 on keyboard assembly 580 couple through connectors 582, 552 to a corresponding set of point stick signal traces 558 on palmrest assembly 530. Touchpad controller 540 couples to traces 558 to sense and decode point stick movements. This arrangement avoids the cumbersome point stick connection arrangement of FIG. 4. Should the keyboard assembly not include a point stick, traces 588 may be left unconnected, or removed from the assembly, with the corresponding connector leads in connector 582 left unused.

The arrangement of point stick buttons 592 also differs from FIG. 4. On keyboard assembly 580, point stick buttons 592 are implemented on keyboard assembly 580. Dedicated point stick button lines, shown in this embodiment as bundled with the keyboard matrix row and column lines 594, 596, serve the point stick buttons 592. In an alternate embodiment, one or more keyboard matrix row or column lines could be shared between the point stick buttons and keyboard rows or columns. In one embodiment, the matrix lines serving the point stick button locations exist whether the keyboard assembly includes point stick buttons or not. The physical buttons are, however, not part of the assembly in some configurations, with the underlying point stick button locations covered and left inactive.

The keyboard matrix 590, including portions of the matrix serving point stick buttons 592, is coupled via keyboard matrix row lines 594 and keyboard matrix column lines 596, through connector 582 and connector 552, to palmrest keyboard matrix row traces 560 and palmrest keyboard matrix column traces 564. Keyboard matrix column traces 564 join with ancillary button column traces 574 to form a combined set of column traces 562, which couple to keyboard controller 550 (i.e., ancillary buttons 600 share some or all of their column traces with keyboard columns). Keyboard matrix row traces 560, as well as ancillary button row trace(s) 572, also couple to keyboard controller 550. Keyboard controller 550 decodes keystrokes and ancillary button presses using signals received via traces 560, 562, and 572.

Ancillary button row traces 572 and column traces 574 couple to ancillary button assembly 600 via a connector 570 on palmrest assembly 530, a wiring harness/cable 598, and a connector 602 on ancillary button assembly 600. Note that different ancillary button assemblies could be used with different button assignments, with appropriate firmware, and/or palmrest module 530 may be used without an ancillary button assembly. The ancillary button assembly (as well as keyboard assembly 580) may also include Light Emitting Diodes (LEDs) that are activated, e.g., from keyboard controller 550 outputs to indicate various functions or provide illumination of buttons, etc.

One feature shown in FIG. 5 is a loopback diagnostic capability. The loopback diagnostic capability uses one or more of I/O controller 510, touchpad controller 540, and keyboard controller 550 to test the integrity of the connections between the motherboard and the palmrest assembly, the palmrest assembly and the keyboard assembly, and the palmrest assembly and the ancillary button assembly. This feature uses, e.g., freed GPIOs on I/O controller 510 and/or free GPIOs on controller 540 and/or controller 550, in conjunction with loopback connections through the connectors. For instance, the previously described loopback traces 506, 508 couple through wires 522, 524 of harness 520 to palmrest assembly 530. On the circuit board of palmrest assembly 530, the connector 532 connections to wires 522, 524 are shorted together by a trace 534. This allows I/O controller 510 to sense and diagnose a lack of connection between motherboard 502 and palmrest assembly 530. In one embodiment, the loopback connections are spaced near opposite ends of connectors 504 and 532, such that a connector that is partially inserted at an angle, with connections made at one end but not the other, can be detected. The 1/O controller 510 notifies processing elements of the IHS when the palmrest assembly is not properly connected.

In FIG. 5, keyboard controller 550 manages similar loopback detection circuits for the connections to keyboard assembly 580 and ancillary button assembly 600. For keyboard assembly 580, a GPIO of keyboard controller 550 is coupled to two loopback traces 554 and 556. Loopback traces 554 and 556 couple through connectors 552 and 582 to the keyboard assembly, where a trace 584 shorts the loopback traces together when the keyboard is connected properly. When the keyboard controller fails to sense a short, it notifies I/O controller 510 of a keyboard disconnect error.

In a similar manner, another GPIO of keyboard controller 550 is coupled to two loopback traces 566 and 568. Loopback traces 566, 568 couple through connector 570, harness 598, and connector 602 to the ancillary button assembly, where a trace 604 shorts the loopback traces together when the ancillary button assembly is connected properly. When the keyboard controller fails to sense a short, it notifies I/O controller 510 of an ancillary button disconnect error.

Figure 6:
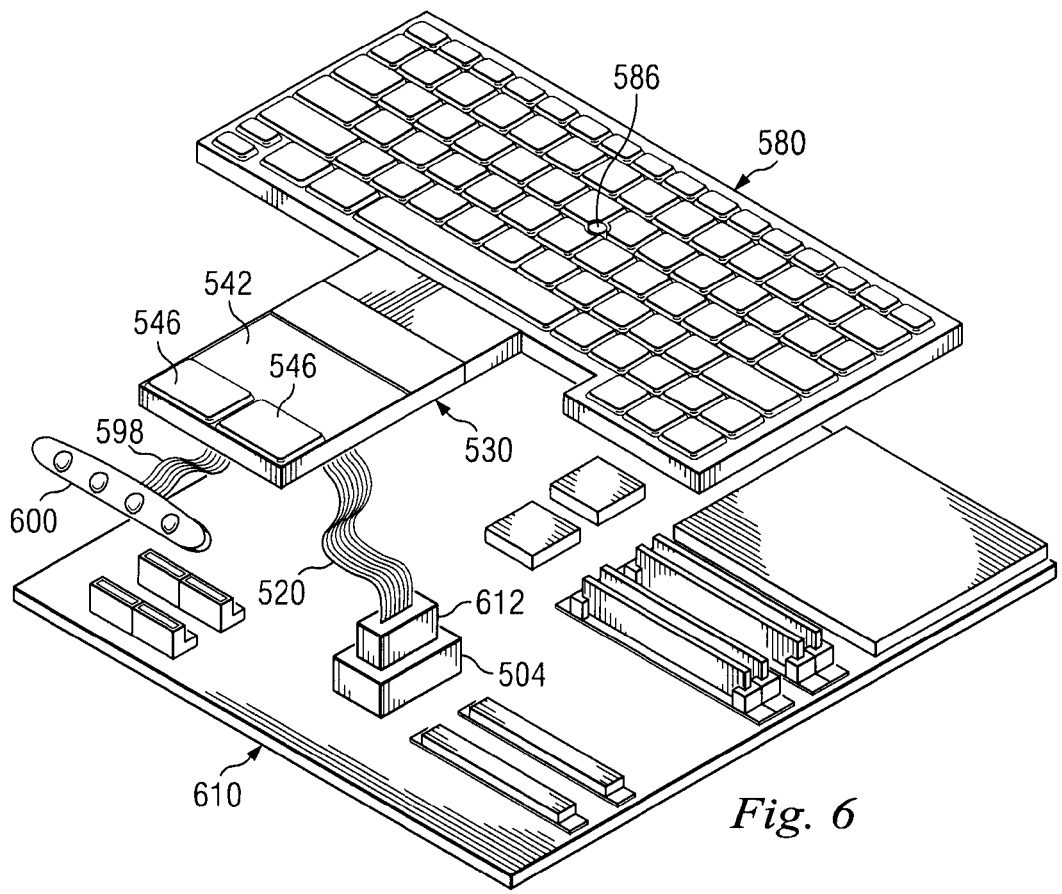
FIG. 6 contains an exploded view of the built-in user controls of the embodiment of FIG. 5.

FIG. 6 contains an exploded view of some of the components of a portable IHS according to an embodiment such as the FIG. 5 embodiment. FIG. 5 depicts the physical layout of the connections between the user input devices of the portable IHS and a motherboard 610. Palmrest assembly 530 and keyboard assembly 580 connect or "dock" directly to each other, making electrical connections in the process for all keyboard and point stick functions. Ancillary button assembly 600 connects to palmrest assembly 530 via ribbon cable/wiring harness 598. Palmrest assembly 530 connects to motherboard 610 via ribbon cable/wiring harness 520, which has a connector 612 that mates with connector 504 on motherboard 610. Generally, ribbon cable/wiring harness 520 contains only a small number of wires as compared to the three motherboard cables of the FIG. 3 configuration. This allows connector 504 to be smaller, more flexible in positioning, and capable of positioning nearer the periphery of the motherboard. The keyboard can also be removed without disturbing any connections to the motherboard.

Figure 7:
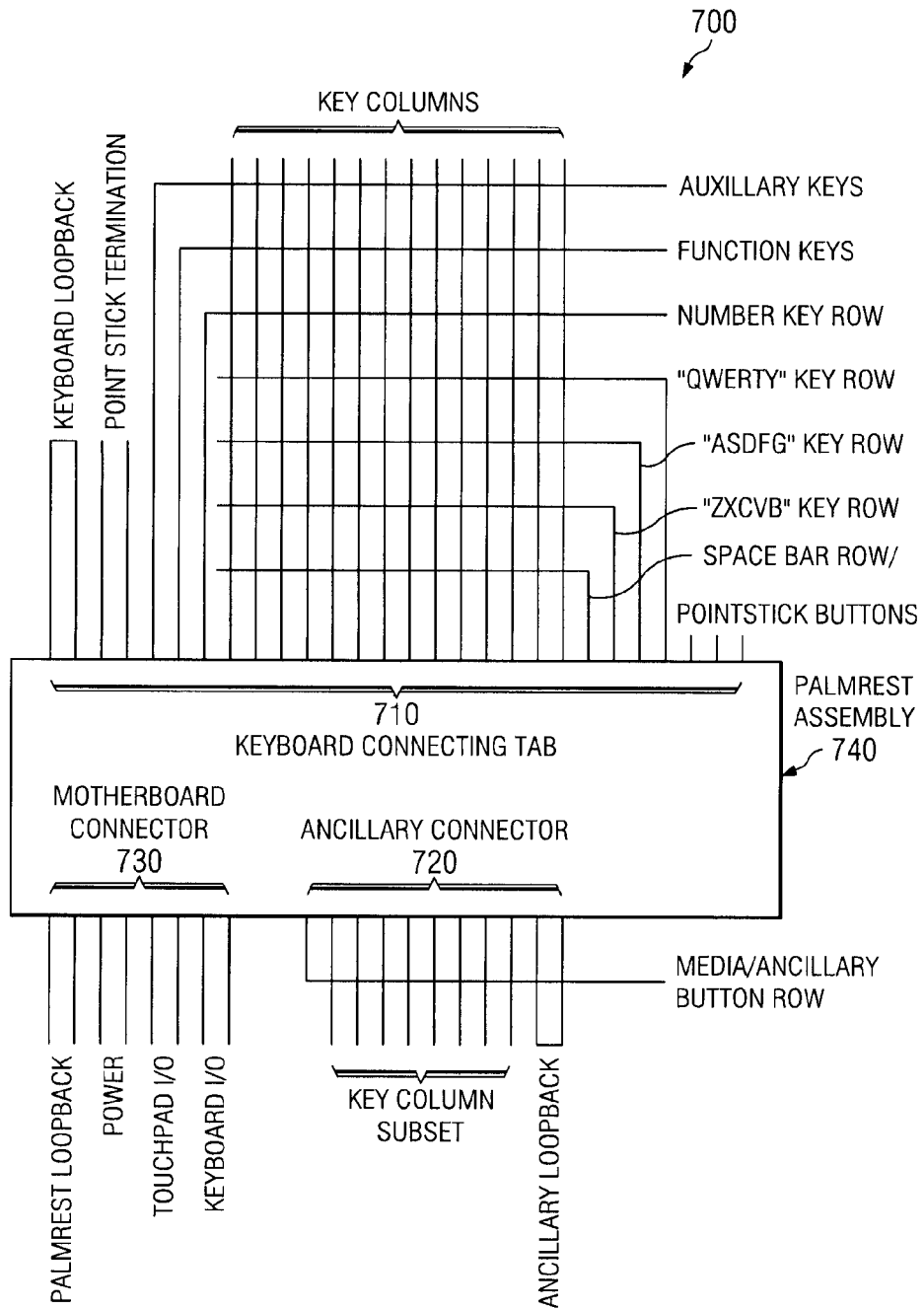
FIG. 7 illustrates a detailed exemplary connection detail for a palmrest assembly according to an embodiment.

FIG. 7 depicts an exemplary arrangement 700 of electrical connections to a palmrest assembly 740. These connections are made at a keyboard connecting tab 710, an ancillary connector 720, and a motherboard connector 730. At the keyboard connecting tab 710, connections exist for a keyboard loopback function, point stick termination, point stick buttons, key columns, and key rows (e.g., auxiliary keys, function keys, number keys, "QWERTY" keys, "ASDFG" keys, "ZXCVB" keys, and space bar row keys). At the ancillary connector, connections exists for an ancillary loopback function, a key column subset, and a media/ancillary button row. At the motherboard connector, connections exist for a palmrest loopback function, power, touchpad I/O, and keyboard I/O. Some functions may require more connections than are shown, depending on implementation. Other functions, such as status LEDs, may also be supported through the connections.

Figure 8:
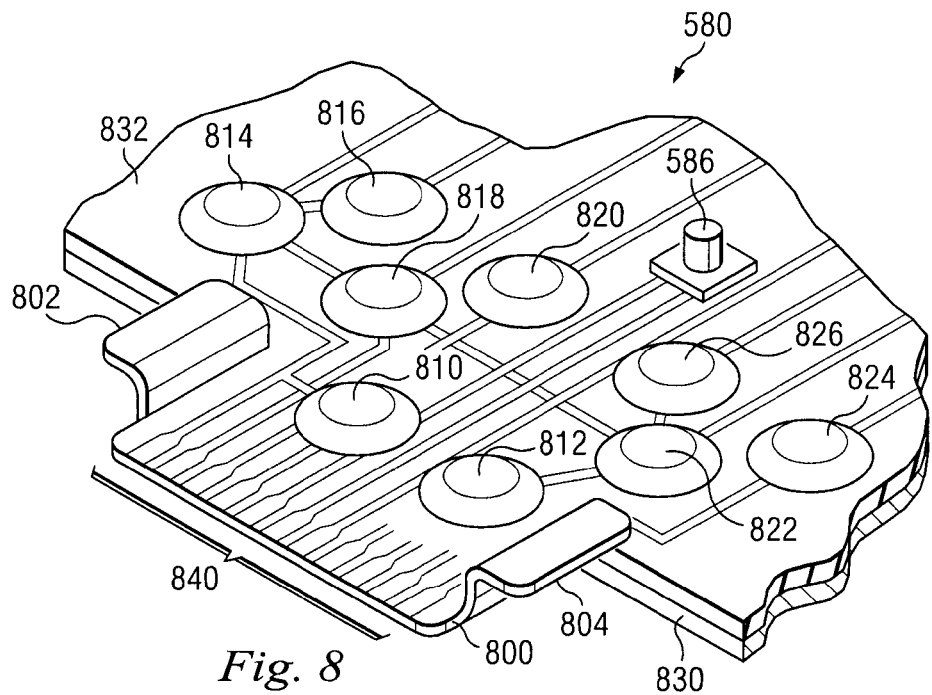
FIG. 8 shows details of a keyboard assembly according to an embodiment.

In one embodiment, the connection between a palmrest assembly and a keyboard assembly is made using a rigid connection tab that is fabricated directly into the keyboard assembly. Such a structure is shown in FIG. 8, which depicts a lower central portion of a keyboard assembly 580, with the keys removed. The keyboard assembly contains a lower support 830, e.g., made of a rigid material such as stamped aluminum sheet. During fabrication of lower support 830, a connection tab 800 with insertion guides 802, 804 is formed.

A keyboard matrix layer 832 overlies lower support 830. The keyboard matrix layer includes row and column traces and appropriate insulating layers. The row and column traces, as well as other traces such as those to point stick 586, route to edge contacts 840 on connection tab 800. A rubber sheet, including rubber domes 810, 812, 814, 816, 818, 820, 822, 824, and 826, overlies the keyboard matrix layer 832. Each rubber dome is placed at the location of a key (not shown) that will exist in the final assembly. A carbon center underlies each rubber dome, such that when an overlying key is depressed, a plunger on the key pushes down on the dome, causing the carbon center to complete a connection with a corresponding row line and column line.

In some embodiments, the same basic assignment of edge connectors 840 is used for point stick and non-point stick versions of the keyboard assembly. Rubber domes 810 and 812 may be non-existent in the non-point stick version, or domes 810 and 812 may be made nonfunctional, e.g., by covering them with a solid member and/or by removing their carbon center.

Figure 9:
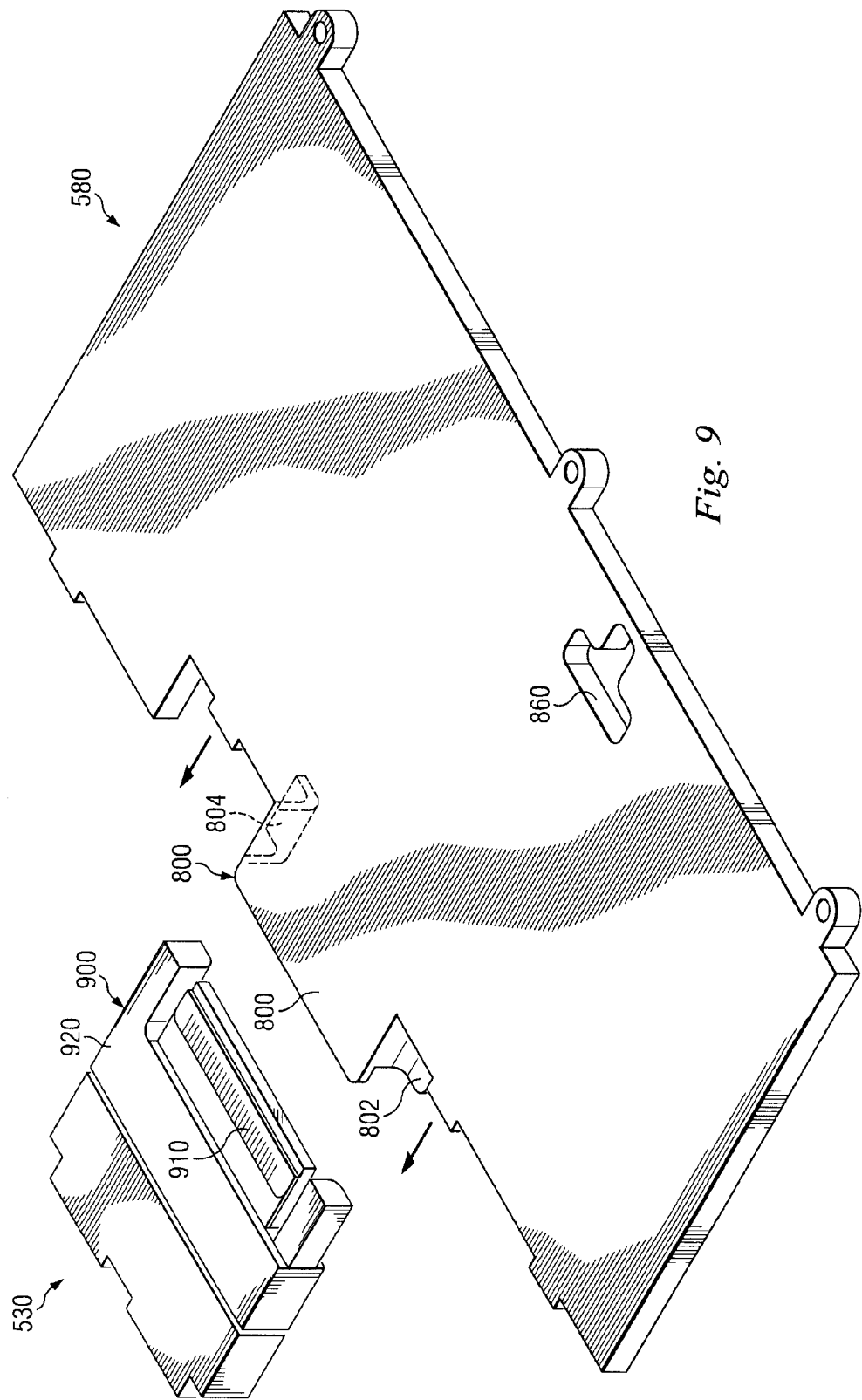
FIGS. 9, 10, and 11a-11c depict assembly details for a portable IHS according to an embodiment.

FIG. 9 shows a bottom view of keyboard assembly 580 and a palmrest assembly 530, illustrating an assembly sequence. An expanded bottom view of one section 900 of palmrest assembly 530 is also illustrated. Section 900 includes a floating docking port 920 to receive keyboard connection tab 800 and its insertion guides 802 and 804. Floating docking port 920 includes a set of contacts 910 to make with edge contacts 840 (FIG. 8) of keyboard assembly 580 when keyboard connection tab 800 is fully inserted. Floating docking port 920 preferably flexes upwards (down in FIG. 9) to allow the keyboard connection tab 800 to be tilted downwards slightly for insertion. Floating docking port 920 preferably also allows slight transverse shifts to accommodate alignment of the keyboard assembly with the IHS chassis. To accommodate these features, contacts 910 can connect to the circuit board of palmrest assembly 530 via a flexible flat cable or the like.

One other feature shown in FIG. 9 is a T-shaped slot 860 in the rigid lower member of keyboard assembly 580. Slot 860 facilitates assembly, and will be explained further below with respect to FIGS. 11a-11c.

Figure 10:
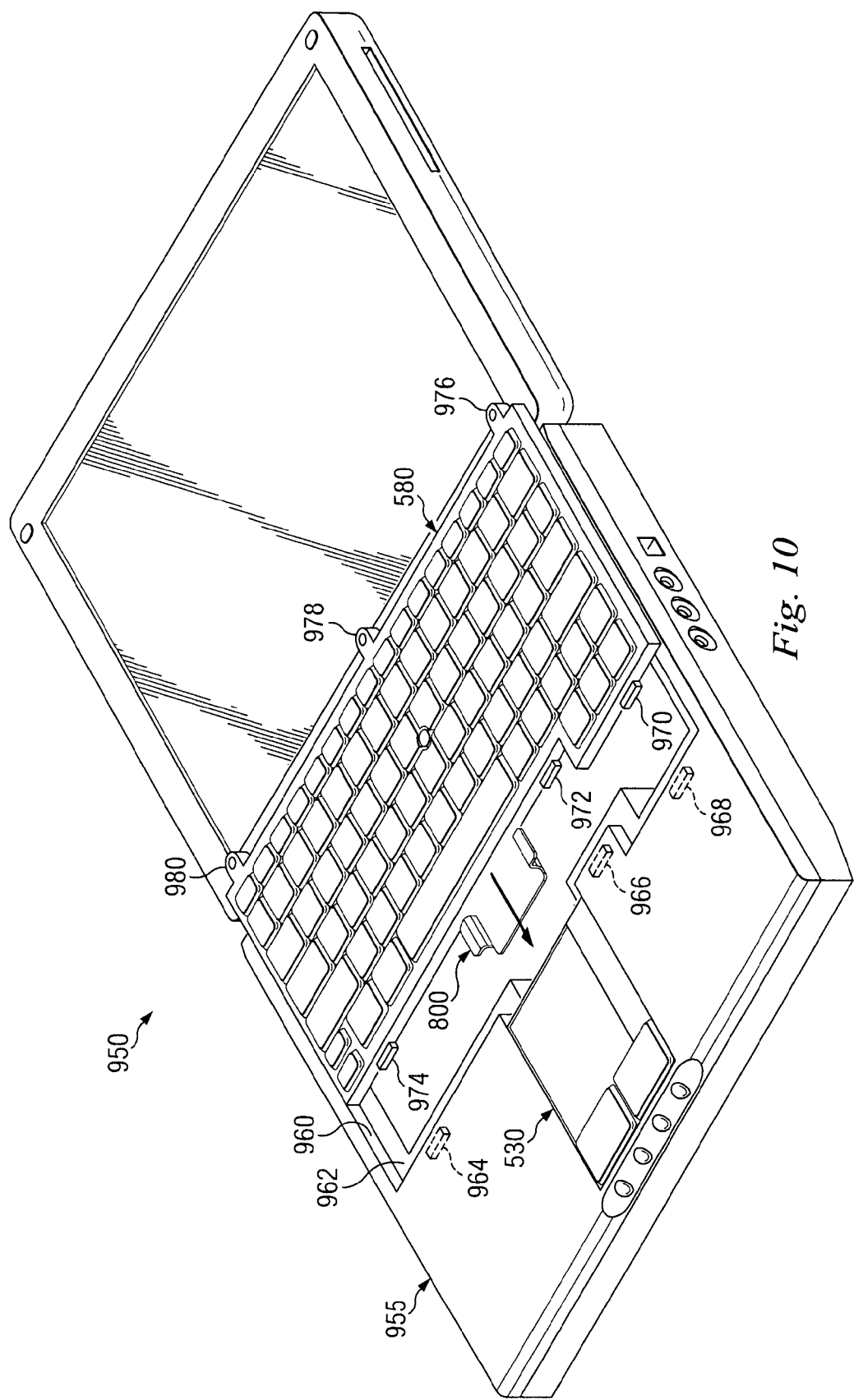

FIG. 10 shows further details of the assembly of a portable IHS 950 according to an embodiment. In FIG. 10, palmrest assembly 530 has been previously assembled to a lower clamshell chassis 955 of portable IHS 950. The upper surface of chassis 955 contains an opening 960 to receive keyboard assembly 580. Opening 960 includes a depressed lip 962 to support keyboard assembly 580 in the final assembly.

Keyboard assembly 580 is assembled to portable IHS 950 by first engaging keyboard connection tab 800 with the floating docking port on the bottom side of palmrest assembly (see FIG. 9) and sliding the keyboard assembly towards the palmrest assembly. Keyboard assembly 580 includes locator tabs 970, 972, 974 to engage respectively with three locator slots 964, 966, and 968 in the lower edge of depressed lip 962, as the keyboard assembly nears its final alignment. Fastener tabs 976, 978, 980, located along the top edge of keyboard assembly 580, can then receive fasteners to secure the keyboard assembly to the portable IHS.

Figure 11A:
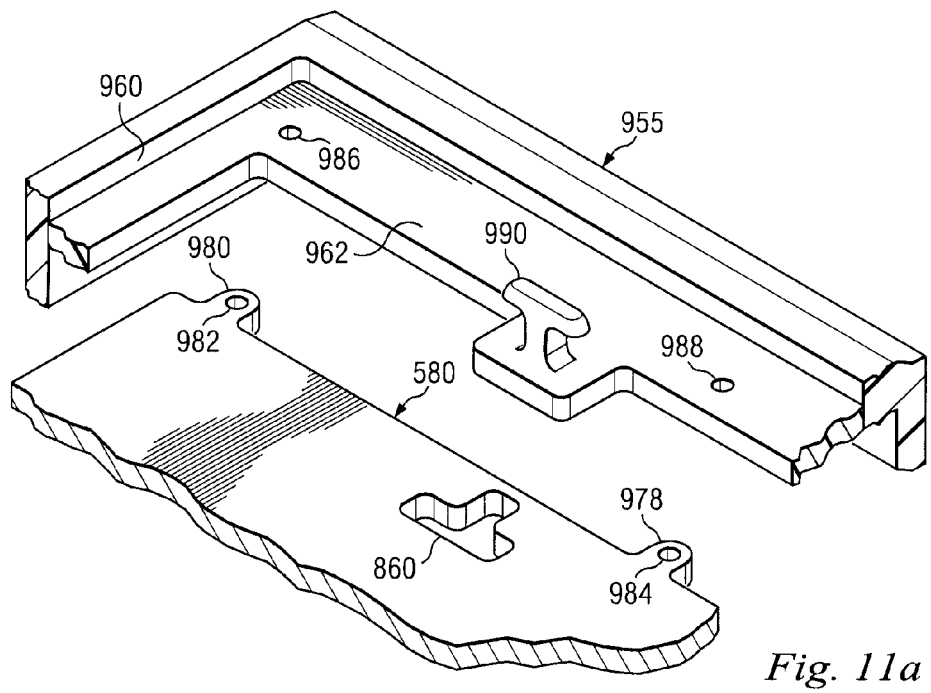
Figure 11B:
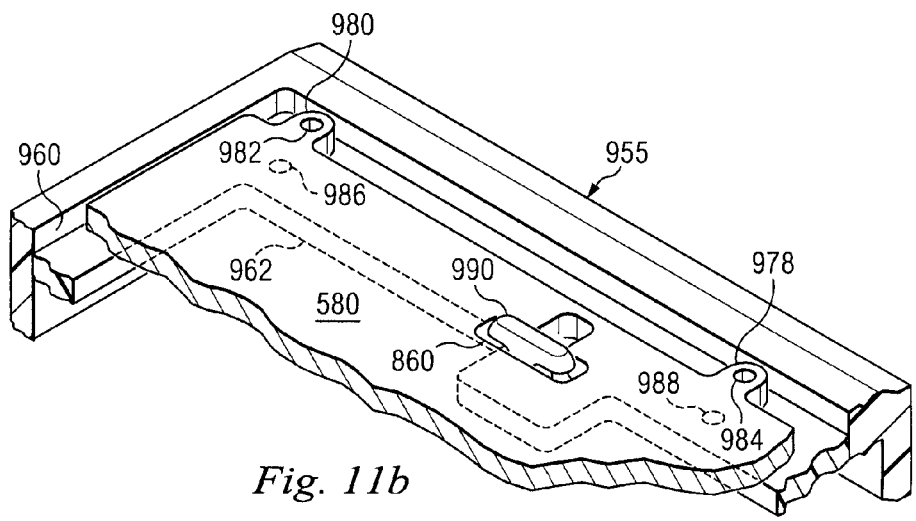
Figure 11C:
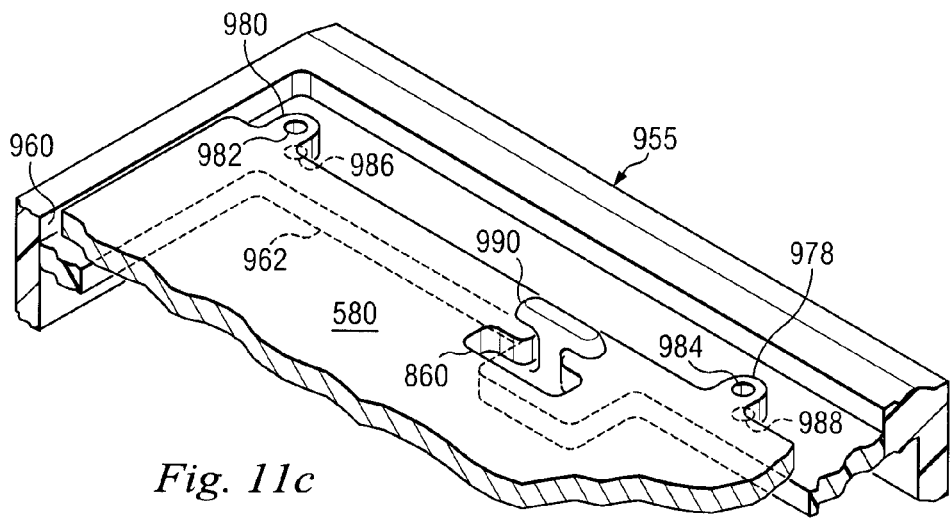

FIGS. 11a-11c show an additional keyboard retention feature useful in embodiments. FIGS. 11a-11c show a magnified view of one section of chassis 955 and one section of keyboard assembly 580 during the final assembly process. Keyboard detail is omitted such that the T-shaped slot 860 in the rigid lower member of keyboard assembly 580 is visible. Fastener tabs 980 and 978 are also visible, with their respective fastener holes 982 and 984.

The magnified section of chassis 955 includes additional details for the depressed lip 962 of opening 960. Lip 962 includes fastener mounting holes 986, 988, which will align with fastener holes 982 and 984 in the final assembly. Lip 962 also includes a mushroom connector 990 protruding from its bottom surface.

In FIG. 11b, keyboard connection tab 800 has been engaged sufficiently with the floating docking port on the bottom side of the palmrest assembly (see FIGS. 9 and 10) to allow the keyboard assembly 580 to lie flat against lip 962. Before the keyboard assembly can lie flat, mushroom connector 990 must align with the wider section of T-shaped slot 860, such that the mushroom connector can protrude through the slot. In this position, tabs 800, 970, 972, and 974 are not yet fully engaged, and fastener holes 982 and 984 are not yet aligned with fastener mounting holes 986, 988.

In FIG. 11c, the keyboard assembly has been fully engaged by sliding it towards the lower edge of lip 962. In the fully engaged position, mushroom connector 990 is retained in the narrower portion of T-slot 860. The mushroom prevents lifting of the upper edge of keyboard assembly 580 with the assembly in final alignment. In this alignment, fasteners can now be inserted into fastener holes 982 and 984 and secured to fastener mounting holes 986, 988.

Figure 12:
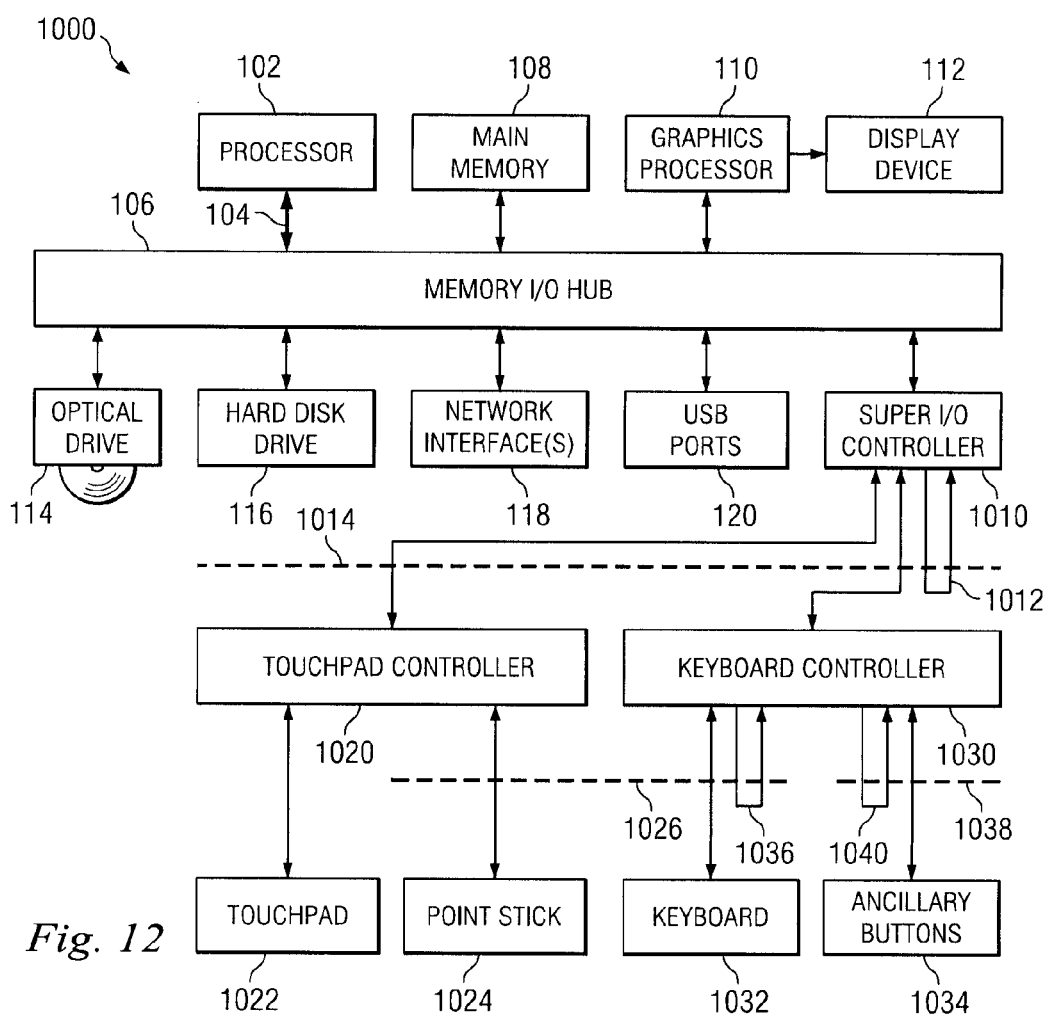
FIG. 12 is a block diagram illustrating an embodiment of an IHS.

FIG. 12 illustrates a block diagram for a portable IHS 1000 including features described above. Processor 102, frontside bus 104, memory I/O hub 106, main memory 108, graphics processor 110, display device 112, optical drive 114, hard disk drive 116, network interfaces 118, and USB ports 120 function in similar fashion to their counterparts in FIG. 1. A super I/O controller 1010 communicates upstream with memory I/O hub 106, and communicates downstream with a touchpad controller 1020 and a keyboard controller 1030. The connections to controllers 1020 and 1030 are made across a palmrest interface 1014. A palmrest loopback circuit 1012 is also coupled across palmrest interface 1014, and connects to super I/O controller 1010.

Touchpad controller 1020 communicates with a touchpad 1022, and communicates with a point stick 1024 across a keyboard interface 1026.

Keyboard controller 1030 communicates with a keyboard 1032 across the keyboard interface. A keyboard loopback circuit 1036 is also coupled across keyboard interface 1026, and connects to keyboard controller 1030. Keyboard controller 1030 also communicates with ancillary buttons 1034 across an ancillary interface 1038. An ancillary loopback circuit 1040 is also coupled across the ancillary interface 1038, and connects to keyboard controller 1030.

Various features of the embodiments above can be combined in a variety of ways, or implemented using other mechanical and/or electrical constructs. Embodiments can be implemented with a variety of user selection controls. A keyboard assembly that will never support a point stick or point stick buttons need not have edge contacts and matrix traces for point stick controls. Likewise, a palmrest assembly need not have a touchpad and related electronics, and could have other selection controls such as a track ball. Other connections, such as a power button connection, could route directly from the keyboard through the palmrest assembly to the motherboard. Key switches other than rubber dome switches can be used to translate user keystrokes and button presses into electrical signals.

In some embodiments, keyboard commonality across platforms is aided by dimensionally referencing the keyboard "center" (intersection of "G", "B", and "H" keys) to the touchpad. Various chassis can then be designed to accept the same basic keyboard layout.

Although illustrative embodiments have been shown and described, a wide range of other modification, change and substitution is contemplated in the foregoing disclosure. Also, in some instances, some features of the embodiments may be employed without a corresponding use of other features. Accordingly, it is appropriate that the appended claims be constructed broadly and in manner consistent with the scope of the embodiments disclosed herein.

What is claimed is:

1. A diagnostic system for a portable computer, the diagnostic system comprising:
   a motherboard having a first I/O controller;
   a palmrest assembly having a second I/O controller;
   a bus connection linking the first I/O controller to the second I/O controller through the motherboard and palmrest assembly;
   a keyboard assembly connected to the palmrest assembly through the connection of a keyboard assembly connector on the keyboard assembly and a palmrest assembly connector on the palmrest assembly, wherein the palmrest assembly connector is operable to receive the keyboard assembly connector while the palmrest assembly is assembled to a housing that houses the motherboard; and
   a first loopback circuit on the palmrest assembly and keyboard assembly, the loopback circuit allowing the second I/O controller to test the continuity of the connection between the keyboard assembly and the palmrest assembly.

2. The diagnostic system of claim 1, the second I/O controller reporting a loss of continuity to the keyboard assembly to the first I/O controller.

3. The diagnostic system of claim 1, further comprising a second loopback circuit on the motherboard, bus connection, and palmrest assembly, the second loopback circuit allowing the first I/O controller to test the continuity of the connection between the motherboard and the palmrest assembly.

4. The diagnostic system of claim 1, wherein the second I/O controller is a touchpad controller.

5. The diagnostic system of claim 1, wherein the second I/O controller is a keyboard controller.

6. The diagnostic system of claim 1, further comprising an ancillary button assembly coupled to the palmrest assembly, and a third loopback circuit on the palmrest assembly and ancillary button assembly, the third loopback circuit allowing a continuity test of the coupling between the ancillary button assembly and the palmrest assembly.

7. The diagnostic system of claim 6, wherein the continuity test of the coupling between the ancillary button assembly and the palmrest assembly is performed by the second I/O controller.

8. The diagnostic system of claim 6, wherein the palmrest assembly further comprises a third I/O controller, and wherein the continuity test of the coupling between the ancillary button assembly and the palmrest assembly is performed by the third I/O controller.

9. A portable information handling system comprising:
a housing;
a motherboard located within the housing;
a palmrest assembly assembled to the housing and coupled to the motherboard through at least one serial bus;
a pointing device assembled to the housing to allow user pointing inputs, the pointing device coupled to the motherboard through the palmrest assembly, wherein the palmrest assembly connects to the pointing device while the palmrest assembly is assembled to the housing;
a keyboard assembled to the housing to allow user keyboard inputs, the keyboard coupled to the motherboard through the palmrest assembly, wherein the palmrest assembly connects to the keyboard while the palmrest assembly is assembled to the housing;
at least one I/O controller, located off the motherboard in the palmrest assembly, to decode the user pointing inputs and decode user keyboard inputs, wherein the
at least one serial bus is operable to communicate the decoded user pointing inputs and the decoded user keyboard inputs to the motherboard; and
a loopback circuit to test the continuity of the connection between each of the keyboard and pointing device with the palmrest assembly.

10. The portable information handling system of claim 9, wherein the at least one I/O controller comprises a keyboard controller to decode the user keyboard inputs and a pointing device controller to decode the user pointing inputs.

11. The portable information handling system of claim 9, wherein the at least one serial bus comprises a first serial bus to communicate the decoded user keyboard inputs to the motherboard and a second serial bus to communicate the decoded user pointing inputs to the motherboard.

12. The portable information handling system of claim 11, wherein the first and second serial buses share a common multiconductor cable connecting to the motherboard.

13. The portable information handling system of claim 9, wherein the at least one I/O controller is located in a common module with the pointing device.

* * * * *